Dec. 28, 1948. A. C. FISCHER 2,457,219
SPONGE RUBBER GARMENT PRODUCTS
Filed June 19, 1940

Inventor
Albert C. Fischer,
By Knight Bros.
Attorney

Patented Dec. 28, 1948

2,457,219

UNITED STATES PATENT OFFICE 2,457,219

SPONGE RUBBER GARMENT PRODUCT

Albert C. Fischer, Chicago, Ill.

Application June 19, 1940, Serial No. 341,382

7 Claims. (Cl. 2—243)

My invention relates to an improvement in various uses of sponge rubber and articles made therefrom, especially to those types of sponge rubber which lend themselves to porous sponge rubber materials in which the pores are connected by passage-ways as distinguished from those types of sponge rubber in which many of the pores are closed and remain intact, that is, where many of the cells have no interconnecting passageways, yet I do not wish to eliminate the possibility of using sponge rubber materials or cellular rubber materials which have their cells filled with gases of various kinds in which the cells remain closed depending upon the use to which the material is to be put. The general object of my improvement is to provide a porous housing means for various types of material. For instance, I may wish to use in conjunction with sponge rubber, such materials as bituminous products, petrolatum, plaster-of-Paris fillers, paraffin fillers, plastic fillers in a semi-fluid or fluid state, and fillers which in turn may become hard and retain the sponge rubber in the shape in which it hardens. Products created therefrom may be varied and the uses to which this sponge rubber is put may be varied.

A further object of my invention is to prepare bathing suits from this porous sponge rubber material in which the thickness of the bathing suit may be varied so that the heaviest and thickest part of the bathing suit is on a line around the chest just below the armpits. This heaviness and thickness may extend over the shoulders in the shape of supports or may be limited to the height of the armpits, and other fastening means such as straps over the shoulders may be relied upon to keep the suit in place. The object of my invention in utilizing this material is to take advantage of the porous cellular material and have the pores encased about the chest and shoulders. My purpose is to then seal the outer pores of this material and utilize the buoyancy of the material to carry the body in an erect position in the water. This type of bathing suit is particularly adapted to children and is a safeguard for children in the water. The development of the thickness about the chest is to give the upper part of the body a better support than the lower part of the body and to give freer action to the limbs below the waistline. The part about the chest may be as much as two inches in thickness and gradually diminish in thickness approaching the waistline after which it is preferable to have the porous material in much less thickness. In this case, I may particularly adopt a cellular structure in which gas is maintained and in which the cells are kept in an unbroken state. Also, I may utilize other types of sponge rubber in which the cells are highly porous but in which the outer surfaces have been treated to make them waterproof, thus insuring no penetration to the inner cells; or I may treat the outside of this bathing suit as above stated and block it off in sections by penetrating the cells along given lines and shutting off any possibility of penetration to the cells of certain areas so that if a leak in the suit should develop it may be limited to certain sections and such sections would readily become apparent by reason of the cold band which would follow infiltration of water into any one of those sections. The suit may be blocked off in sections by penetrating along definite lines the pores of the material with such materials as paraffin, various types of waxes and rubber mixtures of various kinds. These filled in sections would act as stiffening ribs. The various sections of the bathing suit construction of different thicknesses permit adjustments to be made for different figures in order to obtain esthetic effects in many cases, which are impossible to obtain with ordinary bathing suits.

I might likewise build up bathing caps in the same manner and have the cap cut in the shape of a hood. Various areas about the head may be made of thickened sponge rubber, especially that portion back of the neck and back of the lower part of the skull and preferably along the sides of the head about the ears. This would act as a support to hold the head erect and support the swimmer or person in the water who may wish to rely on such support in case of danger. I would thus mold the bathing cap so that these portions of the cap which would support the head in the water would be prepared thicker in those areas than it would in the area which does not have to have such support. I would treat this cap in the same manner as the bathing suit so that the outer pores are filled with a waterproofing material forming a sealing surface so as to prevent any penetration of water into the inner cells. I might likewise reinforce this cap with certain lines of stiffening by penetrating the cells with a stiffening fluid along the lines desired.

I may prepare from this sponge material waterproofing garments such as skirts, coats, and so forth.

One of the particular uses to which this process and product might be used is that of body building and in the shaping of garments adapted to fit the body, to hold the muscles in proper form, and to gradually put back into proper place those protruding bulges, fatty protuberances or muscular tissue disturbances caused either by irregularities in diet, by certain acts, or nature, etc.

A further object of my invention is to utilize this material in foundation garments for men and women, more particularly for women. Use may be made of this porous material in conjunction with webbing materials, either elastic or non-elastic, as now used; or this material may be utilized to replace this webbing material because of its greater porosity and lightness as well as stretching control. By stretching control, I mean that a certain sponge rubber sheet may give forth a certain degree of elasticity depending upon its porosity and the elastic condition of the rubber from which it is made. In addition to the control by ingredients and degree of elasticity in the rubber, I have an additional control by reason of stiffening veins, branches, lines or patterns which may retard the stretching of the cellular sponge material. For instance, as an illustration, I may wish to control a certain area or fatty tissue of the body, and I may build a circular vein of hardening material around the area to be controlled, thereby moving the protruding area by these reinforcing lines into an area where there would be less resistance because of the cellular condition of the porous material and consequently force the surplus material into that area. Thus in this manner I can control the stretch of the sponge rubber in any direction and force muscular material into a given area. This is highly important in controlling figure dimensions in supports such as trusses, foundation garments, girdles and the like.

As a further object of this improvement, I find that this soft porous sponge rubber is distinguished from sponge rubber not completely porous or having the cells connected with passageways through which air can readily penetrate. I find this material either veined or non-veined adaptable for panels, for panties, girdles and other foundation garments. I find this material particularly adapted for rests below the breasts in corsetwear, first because of its porosity, second because of its lack of stiffness, and third because of its elastic resiliency. It is readily adapted to panel work in corsetry and foundation garments, and is particularly adapted for slenderizing where the entire garment is made of this material or partially fabricated from this material. In girdle-wear the veining may be accomplished along the lines of the waistband for firming the material without regard to fabrics or elastics or various types of webbing, although such webbing may be highly desirable. In the use of this material for girdles, it may be highly desirable to fabricate part of the girdles with fabric and part with this sponge material. It lends itself readily to panels, particularly in fashioning panties, in which part of the garment may be of lace or other material and the center panel of sponge rubber, which, by the waistline, may flow out on either side and act as a supporting means and said supporting area may be veined for better control. This porous sponge rubber may be utilized in conjunction with corsetwear, with the exception of the panels fabricated from the usual materials utilized in their manufacture; or it may be desirable to have this corsetwear made in panels and instead of having steel stays or other types of stays, to have some support with lines of stiffening produced by veining. In other words, the same support would be secured without danger of pinching when the stiffening is produced by the ordinary materials, yet having the stiff binding property in the sponge rubber itself which would readily give upon the sagging of any part of the body when placed under strain. Such area may be embellished with linings, laces, or other suitable decorations for smoothness and comfort when applied directly next to the skin. Corsetwear in relation to this type of construction may or may not have the brassière portions attached to the corsetwear. Where they are attached, greater comfort will be secured if the base of the brassière is fabricated out of a cushion-like sponge rubber of great porosity, or if sponge rubber acts as a lining to fabric in such area. The upper part of the brassière may be of lace, silks or other types of fabrics usually employed for that purpose.

A further object of my invention is to form support brassières from this material either by using the material in combination with fabrics or other elastics or using this material for the entire brassière. Where utilized in conjunction with other fabrics, it may be desired to have the base lined with this cushioning soft porous or penetration sponge rubber, in which case the lower half of the supports would constitute the base of the support or would constitute the interior lining of the base of the support. The top of the support would be of lace or other suitable fabrics. Another departure of this improvement would be to form brassières as a form preserving brassière in which case the shoulder straps and the back support or strap would be of fabric material or webbing and the contour or supporting feature would be formed out of porous or penetrating sponge rubber as distinguished from sheet rubber or sponge rubber that is not entirely air penetrating. In the case of the manufacture of these forming brassières, the outline of the support would be the outline desired in the forming and the contour of this outline would be the form desired to attain. In the past art, it has merely been the plan to support the breast from sagging and not form and mold the proper outline or attempt to preserve the natural form previous to such sagging or distortion, or merely to give comfort from said sagging and continuous distortion which comes with advancing age and natural causes which if not controlled may be lasting. This is particularly true of married women who have had children and have nursed them, and by reason of the added strain have failed to preserve the youthful outline which they so highly value. My object is to build these form creating brassières in a manner whereby the supporting veins throw the tissue back into its natural position and form, and at the same time producing comfort. This is particularly true for women who are, or have nursed children and in the enthusiasm for their children, may often neglect themselves. In these forming brassières, the preferred form is to have cuplike receptacles suited to the individual in which the supporting veins are so built in that the cuplike receptacle is self-supporting, that is, the base veins resting upon the chest and the support being rendered from this area to the apex of the breast. Such forming brassières may be self-contained by a suction means without the necessity of supporting straps, or the cuplike receptacles may be joined together with suitable fabrics and straps extending around the back and supports over the shoulders. Likewise, these cuplike receptacles may be formed of a thicker dimension at the base than at the apex of the forming cups and the veins may radiate from such base to the apex of the cup. Likewise it may be highly desirable to move the extremity of the apex for greater comfort. Numerous variations of this improvement either in brassières or natural forming brassières may be made and said veining may be entirely omitted where said receptacles are used for comfort and where the question of reforming or remoulding does not enter in as may be the case in wear for young misses or unmarried women, or women who have not nursed children.

One embodiment of the invention is illustrated in the accompanying drawing, wherein Fig. 1 illustrates a perspective view of a bathing suit in accordance with the present invention;

Figure 1:
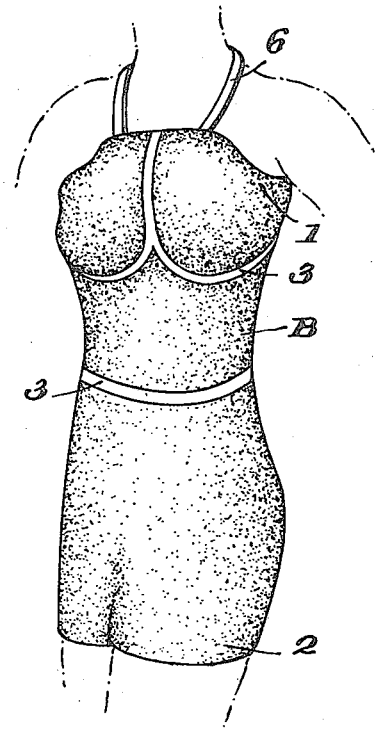
Figure 2:
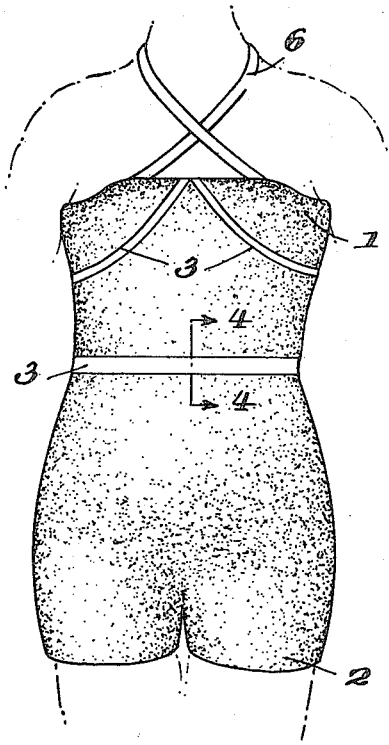
Fig. 2 is a rear view thereof.
Figure 3:
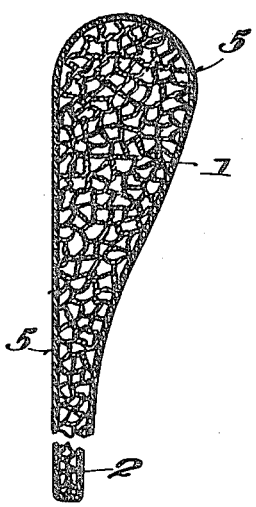
Fig. 3 is a vertical section view of the bathing suit extending from the top to the bottom thereof.
Figure 4:
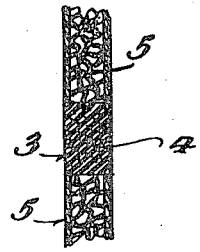
Fig. 4 is a vertical sectional view along line 4—4 of Fig. 2.

The bathing suit B is shown formed of porous sponge rubber having an upper portion 1 which is of substantial thickness in order to give maximum buoyancy effect to the wearer. The thickness of the bathing suit at the upper portion tapers downwardly towards the waist and toward the lower portions of the bathing suit 2 which is of normal thickness in order to offer no hindrance to the movements of the wearer. The porous sponge rubber is sealed by a surface coating 5 of rubber or other material in order to prevent the penetration of water into the interior of the suit and thereby to affect deleteriously the buoyancy thereof. The bathing suit may contain a plurality of filler strips or stiffening ribs 3 having upon the interiors thereof such materials as paraffin, waxes or rubber mixtures which operate to sectionalize the suit along any desired lines. Such fillers are illustrated as 4 in Fig. 4 the surface margins 3 of which coincide with the surface outlines 5 of the garment. These are shown in the drawing applied to the chest and waist of the wearer. Suitable reenforcing ribs may be applied along any other lines depending upon the molding effects desired to be exerted upon the wearer.

The bathing suit may be supported by shoulder or neck straps 6 of sponge rubber or any other suitable material and if desired the bathing suit may be made self-sustaining without the provision of such straps.

I claim:

1. A garment formed of sponge rubber having portions thereof reenforced with solid fillers and also of different thickness for obtaining the desired supporting and shaping effects.

2. A garment formed of latex foam sheeting of varying thickness corresponding to the degrees of cushioning and reenforcement desired at the different portions thereof with the cells of the foam being sealed on the external surface of the garment and solid fillers in said cells along predetermined sectional lines conforming to the shape of the body to which the garment is adapted to be applied to obtain desired reenforcing and shaping effects.

3. A foundation garment formed of porous sponge rubber of varying thickness corresponding to the shaping effects adapted to be executed thereby and reenforced along the body lines with solid fillers.

4. Sheet material for garments consisting of cellular porous rubber with sealed external surfaces and provided with solid fillers along predetermined lines of said cells and conforming to the shape of the body to which the garment is adapted to be applied to obtain a reinforcing and shaping effect at said lines.

5. Sheet material for garments composed of cellular sponge rubber sheeting with sealed external surfaces having thickened portions to increase the buoyancy effect of said sheet material at said thickened portions and provided in addition with solid fillers along different lines of said sheeting to control the variable support of said sheeting at points proximate to and distant from said lines of solid fillers relative to the yielding support afforded by the cellular portions of said sponge rubber sheeting in conformity to the shape of the body to which the garment is adapted to be applied.

6. A garment or bathing suit formed of porous sponge rubber of varying thickness with the maximum thickness extending around the chest below the armpits, said sponge rubber having the outer pores thereof sealed to obtain an enhanced buoyancy effect, and with portions of said garment arranged in sections divided by solid filler ribs around the waistline and surrounding the breast portions of the chest to the upper edge of the garment.

7. A garment or bathing suit formed of porous sponge rubber of varying thickness with the maximum thickness extending around the chest below the armpits, said sponge rubber having the outer pores thereof sealed to obtain an enhanced buoyancy effect, and with portions of said garment sectionalized by the interposition of filler ribs along predetermined lines of the garment to obtain reenforcing and shaping effects thereby, said filler ribs extending around the waistline and from the upper edge of the front of said garment between the breasts and thereunder under the arms to the upper edge of the back.

ALBERT C. FISCHER.

REFERENCES CITED

The following references are of record in the file of this patent:

UNITED STATES PATENTS

| Number | Name | Date |
|---|---|---|
| 795,562 | Tatti | July 25, 1905 |
| 817,020 | Thompson | Apr. 13, 1906 |
| 1,426,402 | Moore | Aug. 22, 1922 |
| 1,504,916 | Teiber | Aug. 12, 1924 |
| 1,548,571 | Abramowitz | Aug. 4, 1925 |
| 1,759,711 | Price | May 20, 1930 |
| 1,777,945 | Untiedt | Oct. 7, 1930 |
| 1,810,486 | Lancaster | June 16, 1931 |
| 1,812,936 | DeFaveri | July 7, 1931 |
| 1,983,677 | Riley | Dec. 11, 1934 |
| 2,023,252 | Stein | Dec. 3, 1935 |
| 2,064,898 | Fetter | Dec. 22, 1936 |
| 2,066,503 | Wiggers | Jan. 5, 1937 |
| 2,106,943 | Fischer | Feb. 1, 1938 |
| 2,216,785 | Roberts | Oct. 8, 1940 |
| 2,217,605 | Carter | Oct. 8, 1940 |
| 2,218,947 | Brunzell | Oct. 22, 1940 |
| 2,226,564 | Keinitz | Dec. 31, 1940 |

FOREIGN PATENTS

| Number | Country | Date |
|---|---|---|
| 127,390 | Great Britain | May 27, 1919 |
| 327,496 | Germany | Oct. 13, 1930 |
| 358,997 | Great Britain | Oct. 19, 1931 |
| 425,577 | Great Britain | Mar. 18, 1935 |
| 800,136 | France | Apr. 20, 1936 |